United States Patent [19]

Motz et al.

[11] 4,320,171

[45] Mar. 16, 1982

[54] MAGNETIC RECORDING MEDIA CONTAINING ELASTOMERIC POLYURETHANE BINDERS IN THE MAGNETIC COATING

[75] Inventors: Herbert Motz, Beindersheim; August Lehner, Roedersheim-Gronau; Heinrich Hartmann, Limburgerhof; Rudolf Bachmann, Frankenthal; Hans-Joerg Hartmann, Feinsheim; Harald Frischmann, Willstaett; Roland Falk, Achern; Joachim Hack, Ludwigshafen; Milan Velic, Ludwigshafen; Helmut Kopke, Ludwigshafen, all of Fed. Rep. of Germany

[73] Assignee: BASF Aktiengesellschaft, Fed. Rep. of Germany

[21] Appl. No.: 150,749

[22] Filed: May 19, 1980

Related U.S. Application Data

[63] Continuation of Ser. No. 961,704, Nov. 17, 1978, abandoned.

[30] Foreign Application Priority Data

Dec. 2, 1977 [DE] Fed. Rep. of Germany ....... 2753694

[51] Int. Cl.$^3$ .................. B32B 27/40; B32B 5/16
[52] U.S. Cl. .................. 428/423.1; 428/423.7; 428/425.1; 428/425.9; 428/900; 528/44; 528/76
[58] Field of Search .............. 428/423.1, 421, 900, 428/423.7, 425.1, 425.9; 528/76, 44

[56] References Cited

U.S. PATENT DOCUMENTS

| | | | |
|---|---|---|---|
| 2,899,411 | 8/1959 | Schollenberger | 528/76 |
| 2,901,467 | 8/1959 | Croco | 528/76 |
| 3,144,352 | 8/1964 | Talley | 428/900 X |
| 3,149,995 | 9/1964 | Bauer | 428/900 X |

*Primary Examiner*—Thomas J. Herbert, Jr.
*Attorney, Agent, or Firm*—Keil & Witherspoon

[57] ABSTRACT

Magnetic recording media comprising a non-magnetic base and, applied thereto, a firmly adhering magnetic coating based on a finely divided magnetic pigment dispersed in a binder which contains at least 50 percent by weight of a special polyurethane elastomer, namely a thermoplastic polyurethane which is soluble in tetrahydrofuran, is free from isocyanate groups and has been manufactured from (A) 1 mole of a hydroxyl-containing polyester having a molecular weight of from 700 to 2,500, (B) from 0.3 to 3 moles of a linear aliphatic diol of 2 to 10 carbon atoms, (C) from 0.05 to 0.4 mole of a triol of 3 to 10 carbon atoms, and (D) from 1.35 to 4.7 moles of a diisocyanate of 6 to 30 carbon atoms, the amount of NCO groups being approximately equivalent to the amount of OH groups of the sum of components (A) to (C).

5 Claims, No Drawings

MAGNETIC RECORDING MEDIA CONTAINING ELASTOMERIC POLYURETHANE BINDERS IN THE MAGNETIC COATING

This is a continuation of application Ser. No. 961,704, which application has now been abandoned, filed Nov. 17, 1978.

The present invention relates to magnetic recording media comprising a non-magnetic base and, applied thereto, a firmly adhering magnetic coating based on a finely divided magnetic pigment dispersed in a binder which contains a special polyurethane elastomer.

Magnetic recording media are used to record and reproduce audio, video and data signals. The ever increasing demands made on these media call for further improvements in their mechanical and electromagnetic properties. For example, the trend toward higher recording densities in the case of the said types of tape makes the production of thinner magnetic coatings necessary. For this reason the packing density of the magnetic material in the magnetic coating and the remanence in the recording direction must be considerably increased, and the distribution of the magnetic material in the coating, and the surface smoothness and thickness uniformity of the magnetic coating must be greatly improved. Even small flaws in the coating such as pinholes and surface asperities result in undesirable information losses. Small local inhomogeneities in the magnetic coating which cause peak shift errors present particular problems. Surface flaws and variations in the coating thickness also cause undesirable modulation of the output signal which can give trouble in all of the said fields of application. All these demands which are made on the magnetic coating with respect to freedom from errors and a uniform signal level at high recording densities may be influenced not only by the dispersibility of the magnetic pigment but also to a high degree by the type of binder used. It is particularly important that the binder should wet the pigment well in order to achieve completely uniform distribution of the pigment therein, exhibit a good flow behavior on the tape base, which is essential for the obtention of a smooth surface, and be completely free from particles which, because of their higher molecular weight, cannot be completely dissolved but are only swollen to a greater or lesser extent by the solvent.

It is known to manufacture magnetic recording media which can be subjected to severe mechanical stresses, using, as the magnetic coating, a dispersion of the magnetic pigment in a binder based on polyurethane elastomers or on mixtures of polyurethane elastomers with other polymeric binders. However, polyester urethane elastomers such as those described, e.g., in German Printed Application DAS No. 1,106,959, or polyether urethane elastomers such as are described, e.g., in U.S. Pat. No. 2,899,411, do not impart sufficient hardness to the surface of the magnetic coating when they are used as sole binder. In addition, the above types of polyurethane elastomers, when used as sole binder, have the disadvantage that magnetic particles dispersed in solutions thereof do not orient satisfactorily in the direction of tape travel when passed through a magnetic field after coating. Moreover, such products which are produced by melt condensation are frequently not completely free from high molecular weight, difficultly soluble components which may cause inhomogeneities in the magnetic coating and surface flaws.

The patent literature contains a number of proposals for overcoming the disadvantages of insufficient coating hardness resulting from the use of polyurethanes as sole binder for the magnetic coating, by admixture of a further binder. However, the improvement in coating hardness brought about by the admixture of a polyester, as disclosed in German Printed Application DAS No. 1,269,661, is attended by the risk of adjacent layers of tape in the pack sticking together under conditions of elevated temperature and pressure. A mixture of polyurethane elastomers and relatively high molecular weight phenoxy resins, as disclosed in German Printed Application DAS No. 1,295,011, shows satisfactory mechanical properties up to temperatures of about 65° C., but the co-use of the phenoxy resin impairs orientation of the acicular magnetic particles in the magnetic field. The use of mixtures of vinyl chloride copolymers with polyurethane elastomers as binders for magnetic coatings has also been disclosed. For example, U.S. Pat. No. 3,144,352 discloses the addition by vinyl chloride/acrylonitrile copolymers to polyurethane elastomers, but the relatively low thermal stability of the resulting product is a disadvantage (cf. German Laid-Open Application DOS No. 2,037,605). A combination of polyurethane elastomers with vinyl chloride/vinyl acetate copolymers as binders for magnetic coatings is proposed in German Printed Application DAS No. 1,282,700, but these combinations do not impart to the magnetic coating the properties it is required to exhibit in practice at elevated temperatures. Mixtures of polyester urethanes with polycarbonates, as proposed in German Laid-Open Application DOS No. 2,114,611, do not give solutions which are entirely satisfactory as regards their viscosity.

It has also been proposed in U.S. Pat. No. 3,149,995 that the polyurethane binder should be produced direct in the coating mix, containing magnetic pigment, prepolymer and solvent, by the addition of a curing agent, the binder being formed by the reaction of the isocyanate groups of the prepolymer with the active hydrogen atoms of the curing agent. A disadvantage of this method is that, as a result of the reaction proceeding rapidly at the outset, fluctuations in the viscosity of the magnetic dispersion may occur which may result in inhomogeneities in the magnetic coating.

German Laid-Open Application DOS No. 2,442,762 also describes the use of thermoplastic polyurethane elastomers in the production of magnetic coatings. These polyurethanes, which are produced in a solvent using a branched aliphatic diol as chain extender, are generally too hard.

It is therefore an object of the invention to provide magnetic recording media having a thin magnetic coating which exhibits outstanding homogeneity and surface smoothness and, at high signal levels, exhibits an outstandingly constant signal level combined with only slight modulation of the playback signal.

We have found that this object is achieved and that magnetic recording media comprising a non-magnetic base and, applied thereto, a firmly adhering magnetic coating consisting essentially of a dispersion of a magnetic pigment in a binder which contains at least 50 percent by weight of a thermoplastic polyurethane have the requisite properties if the polyurethane used is soluble in tetrahydrofuran, is free from isocyanate groups and has been manufactured from (A) 1 mole of a hydroxyl-containing polyester having a molecular weight of from 700 to 2,500, (B) from 0.3 to 3 moles of a linear aliphatic diol of 2 to 10 carbon atoms, (C) from 0.05 to 0.4 mole of a triol of 3 to 10 carbon atoms, and (D) from 1.35 to 4.7 moles of a diisocyanate of 6 to 30 carbon atoms, the amount of NCO groups being approximately equivalent to the amount of OH groups of the sum of components (A) to (C).

The polyurethanes used according to the invention as binders in the magnetic coating generally have a hardness (according to DIN 53,517) of 18 to 35 seconds, a modulus of elasticity (according to DIN 53,457) of from 25 to 35 N/mm$^2$, an elongation at break (according to DIN 53,455) of from 1050 to 1250%, a tensile strength (according to DIN 53,455) of from 75 to 95 N/mm$^2$, and a softening point between 125° and 145° C.

Advantageous hydroxyl-containing polyesters having a molecular weight of from 700 to 2500 are predominantly linear polymers with terminal OH groups, preferably with two OH end groups, and have an acid number of less than 10, preferably less than 3. These polyesters can be manufactured in a simple manner by esterification of aliphatic dicarboxylic acids of 4 to 12 carbon atoms, preferably of 4 to 6 carbon atoms, with aliphatic glycols, preferably glycols of 2 to 12 carbon atoms, or by polymerization of cyclic lactones of 3 to 6 carbon atoms.

Examples of aliphatic dicarboxylic acids which may be used are glutaric acid, pimelic acid, suberic acid, sebacic acid, dodecanedioic acid and, preferably, adipic acid and succinic acid. The dicarboxylic acids may be used individually or as mixtures. When manufacturing the hydroxyl-containing polyesters it may be advantageous to use, in place of the dicarboxylic acids, the corresponding acid derivatives such as carboxylic acid esters of 1 to 4 carbon atoms in the alcohol radical, carboxylic acid anhydrides or carboxylic acid chlorides.

Examples of glycols which may be used are diethylene glycol, pentanediol, decanediol and 2,2,4-trimethyl-1,5-pentanediol. 1,4-butanediol, 1,6-hexanediol and 2,2-dimethyl-1,3-propanediol are preferred. Depending on the desired properties of the polyurethanes, the polyols may be employed individually or as mixtures in different amounts. Examples of cyclic lactones which may be used for the manufacture of the hydroxyl-containing polyesters are $\alpha,\alpha$-dimethyl-$\beta$-propiolactone, butyrolactone and, preferably, caprolactone.

It is an essential feature of the polyurethanes used according to the invention that, in their manufacture, linear aliphatic diols are used as chain extenders and triols are employed to achieve slight crosslinking.

As linear aliphatic diols (component B) there are used compounds of 2 to 10 carbon atoms, preferably of 2 to 4 carbon atoms, e.g. 1,2-ethanediol, 1,3-propanediol and 1,4-butanediol.

As triols (component C) there are used compounds of 3 to 10 carbon atoms, preferaly of 3 to 6 carbon atoms. Examples of suitable triols are glycerol, trimethylolpropane and hexanetriol. The presence of triols in the polyaddition results in slight crosslinking of the endproduct, which, if complete crosslinking does not occur locally, has a positive effect on the mechanical properties of the polyurethane and of the magnetic recording medium produced therewith. To prevent complete crosslinking from occurring locally and the attendant occurrence of gel particles, it is essential that the polyaddition reaction should be carried out in solution.

Particularly suitable diisocyanates of 6 to 30 carbon atoms (component D) for the production of the binders used according to the invention, which react with the hydroxyl-containing polyester (component A), the diols (component B) and the triols (component C), are aromatic diisocyanates, advantageously those of the formula

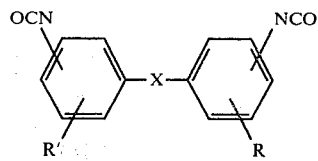

in which X is $CH_2$ or $SO_2$ and R and R' are hydrogen, chlorine or alkyl of 1 to 4 carbon atoms, and R and R' may be identical or different.

Examples of aromatic diisocyanates of the above type are dichloro-diphenylmethane-diisocyanates, dimethyl-diphenylmethane-diisocyanates, 4,4'-, 4,2'- and 2,2'-diisocyanato-diphenylmethanes and the corresponding isomer mixtures and diisocyanato-diphenylsulfones. Outstanding products are obtained with 4,4'-diisocyanato-diphenylmethane, and therefore this aromatic diisocyanate is employed preferentially for the manufacture of the polyurethanes used according to the invention.

The ratio of the components A to D may be varied from about 1.35 to 4.7 moles of diisocyanate per mole of hydroxyl-containing polyester if from about 0.3 to 3 moles of the linear aliphatic diol of 2 to 10 carbon atoms and 0.05 to 0.4 mole of triol are used, the amount of the linear diol used depending in part on the molecular weight of the hydroxyl-containing polyester used. The amount of diisocyanate used should be substantially chemically equivalent to the amounts of hydroxyl-containing compounds, so that at the end of the reaction practically no free unreacted diisocyanate and no free unreacted hydroxyl groups remain. However, for practical reasons it may be advantageous to use a diisocyanate in up to 6% excess over the amount required for complete reaction of the reactants, so that the ratio of the number of hydroxyl groups to the number of isocyanate groups in the reaction mixture is from about 0.98:1 to 1:1.06, preferably from about 1:1.02 to 1:1.05.

The manufacture polyurethanes of the above type which exhibit very advantageous service characteristics when used as binders for magnetic recording media, preferably from 1 to 2 moles of 1,4-butanediol, from 0.05 to 0.3 mole of trimethylolpropane and from 2 to 3 moles of diphenylmethane-diisocyanate are used per mole of hydroxyl-containing polyester having a molecular weight of 700 to 2,500.

The thermoplastic, elastomeric polyurethanes used according to the invention are manufactured in solution by the one-shot or prepolymer process, if appropriate in the presence of catalysts and other auxiliaries and/or additives, e.g. dibutyl-tin dilaurate or triethylenediamine. These products cannot be manufactured batchwise in the absence of solvents because owing to the presence of the triol gel particles are formed to at least some extent in the bulk polyaddition reaction. The risk of complete crosslinking occurring locally, as happens in the bulk polyaddition reaction, is usually avoided in the polyaddition in solution.

Preferred solvents for the manufacture of the polyurethanes are cyclic ethers, e.g. tetrahydrofuran and dioxane and cyclic ketones, such as cyclohexanone. Of course, the polyurethanes can also be dissolved in other strongly polar solvents, e.g. dimethylformamide, pyrrolidone, dimethylsulfoxide and ethylene glycol acetate. Moreover, it is possible to mix the said solvents with aromatics, such as toluene or xylene, and esters, such as ethyl acetate or butyl acetate.

Examples of suitable catalysts for the manufacture of the polyurethanes are tertiary amines, e.g. triethylamine, triethylenediamine, N-methyl-pyridine and N-methyl-morpholine, metal salts, e.g. potassium acetate and zinc stearate and organic metal compounds, e.g. dibutyl-tin dilaurate. The appropriate amount of catalyst depends on the activity of the catalyst in question. In general, it has proved advantageous to use from 0.005 to 0.3 part by weight, preferably from 0.01 to 0.1 part by weight, per 100 parts by weight of aromatic diisocyanate.

Details of the manufacture of the thermoplastic and elastomeric polyurethanes, which are used, according to the invention, as binders in magnetic coatings, are as follows:

In the one-shot process, the starting components are dissolved in a portion of the solvent, so that solutions having a solids content of from 30 to 50 percent by weight are formed. The solutions are then heated to from 20° to 90° C., preferably from 30° to 70° C., whilst stirring. The components are reacted until the desired final viscosity is achieved, and are then diluted to the desired final concentration, the polyaddition reaction being simultaneously stopped by adding monoalcohols, such as methanol, ethanol, sec. propanol, or sec. butanol or secondary amines, such as dimethylamine, ethylpropylamine, dibutylamine and the like. In the prepolymer process, the polyisocyanate, the hydroxyl-containing polyester and, if required, the catalyst and the assistants and additives are reacted in a portion of the solvent at from 20° to 90° C., preferably from 30° to 70° C., to give prepolymers containing isocyanate groups. After a reaction time of from about 0.5 to 2 hours, the diol and the triol are incorporated into the reaction mixture in the course of from 0.5 to 3 hours. Thereafter the reaction takes place as described for the one-shot process. The polyurethane solutions obtained in this way have solids contents of from 5 to 25 percent by weight, preferably from 10 to 20 percent by weight.

The K value, determined by the method of H. Fikentscher (Cellulosechemie, 30, 58 et seq. (1932)), of suitable polyurethane products is from 55 to 75 and preferably from 60 to 70.

The further processing of the solution of the polyurethane elastomeric binder with the magnetic pigment and auxiliaries, to give magnetic recording media, may be carried out by conventional methods.

Conventional magnetic pigments can be used and these of course are also one of the factors determining the properties of the resulting magnetic coatings. Examples of suitable magnetic pigments are gamma-iron(III) oxide, finely divided magnetite, ferromagnetic, unmodified or modified chromium dioxide, cobalt-modified gamma-iron (III) oxide and ferromagnetic metals and metal alloy pigments, e.g. alloys of iron and cobalt (manufactured, for example, according to the instructions of German Pat. No. 1,247,026). Preferred magnetic pigments are acicular gamma-iron(III) oxide and ferromagnetic chromium dioxide. The particle size is in general from 0.2 to 2$\mu$, the range from 0.3 to 0.8$\mu$ is being preferred.

The magnetic coatings may also have added to them in a conventional manner small amounts of additives such as dispensing agents, lubricants and fillers during dispersion of the magnetic pigments or prior to application of the magnetic coating. Examples of such additives are fatty acids or isomerized fatty acids, e.g. stearic acid, or their salts with metals of main groups I to IV of the periodic table, amphoteric electrolytes, such as lecithin, fatty acid esters or waxes, silicone oils, carbon black and the like. The additives are used in the conventional amounts, generally less than 10 percent by weight, based on the magnetic coating, being added.

The polyurethanes according to the invention can be used as sole binder for the manufacture of magnetic coatings, but, when the magnetic recording media of the invention are to be used for special applications, it is advantageous to add a second binder component in amounts of from 10 to 50 parts by weight, preferably from 20 to 40 parts by weight, based on the resulting total amount of binder. Suitable second binders are, in particular, vinyl chloride polymers which are substantially compatible with the polyurethane binder, phenoxy resins, preferably polycondensates manufactured from epichlorohydrin and bisphenol A, and polyvinylformal binders.

The weight ratio of magnetic pigment to binder or binder mixture in the recording media of the invention is in general from 1 to 10:1 and in particular from 4 to 6:1. A particular advantage of the mixture according to the invention is that, because of the excellent pigment-binding power of the polyurethanes, high loadings of magnetic pigment are possible in the magnetic coatings without their mechanical properties being impaired and their service characteristics suffering appreciably.

Conventional rigid or flexible base materials can be used as non-magnetic and non-magnetizable bases, particularly films of linear polyesters, such as polyethylene terephthalate, generally having a thickness of from 4 to 200$\mu$, particularly from 10 to 36$\mu$. More recently, the use of magnetic coatings on paper bases has become important for electronic computing and accounting machines; the coating materials according to the invention can be used with advantage for this purpose, too.

Production of the magnetic recording media of the invention may be carried out in a conventional manner. The magnetic dispersion prepared from the magnetic pigment and the solution of the binder or binders in the presence of dispersing agents and other additives in dispersing apparatus, e.g. a tube mill or a stirred ball mill, is advantageously filtered and applied to the non-magnetic base using conventional coating equipment, e.g. a knife coater. Usually, orientation of the magnetic particles is effected before the fluid mix has dried on the base, drying being advantageously carried out for from 2 to 5 minutes at temperatures of from 50° to 90° C.

The abrasion resistance of the magnetic coatings manufactured according to the invention can be improved even further and their thermoplasticity can be reduced by adding a further polyisocyanate, preferably a diisocyanate or triisocyanate, such as 4,4'-diisocyanato-diphenylmethane, or a triisocyanate derived from 3 moles of a diisocyanate, such as toluylenediisocyanate and 4,4'-diisocyanato-diphenylmethane, and 1 mole of a triol, such as glycerol or 1,1,1-trimethylolpropane, especially the reaction product of 3 moles of toluylenediisocyanate and 1 mole of 1,1,1-trimethylolpropane, such polyisocyanates being preferably added to the ready-to-use magnetic dispersion before application to the base. The amount of polyisocyanate added for this purpose is generally about 1 to 15 percent by weight, based on the total amount of binder.

If binders or binder mixtures are used to which, before or during application of the magnetic dispersion to the base, reactive polyisocyanates have been added, there is no need, in contrast to some known polyisocyanate binders, to subject the coated material to a heat treatment after coating, i.e. one which goes beyond normal physical drying, e.g. curing.

The magnetic coatings may be subjected to a conventional surface treatment, e.g. calendering in which the coated material is passed between polished rollers, with the application of pressure and optional heating at temperatures of from 50° to 100° C., preferably from 60° to 80° C. Following this treatment the thickness of the magnetic coating is generally from 3 to 20μ and preferably from 8 to 15μ. In the case of the production of flexible magnetic tapes, the coated webs are slit in the longitudinal direction to the usual widths.

The magnetic recording media of the invention have, as compared with recording media which have been manufactured with conventional polyurethanes or polyurethane mixtures containing suitable harder binders, a magnetic coating exhibiting improved homogeneity and surface smoothness, as a result of which the number of dropouts and drop-ins is appreciably reduced and consequently the peak shift behavior is improved. A further advantage of these smoother and more homogeneous magnetic coatings is that modulation is reduced. In addition, the improved abrasion resistance of the magnetic coatings of the magnetic recording media of the invention should be emphasized. The said improvements manifest themselves not only in the case of media for recording data and audio signals, but also in the case of video recording media where the signal-to-noise ratio is reduced and the waveform of the playback signal is more uniform.

The parts and percentages given in the following Examples and Comparative Experiments are by weight, unless stated otherwise. Parts by volume bear the same relation to parts by weight as the liter to the kilogram.

EXAMPLE 1

6,600 parts of a polyester prepared from adipic acid and butanediol, and having a molecular weight of 1,100. 730 parts of butanediol, 80 parts of trimethylolpropane, 3,862 parts of diphenylmethane-4,4'-diisocyanate are dissolved in 26,000 parts of tetrahydrofuran in a reaction vessel having a capacity of 150,000 parts by volume which can be heated and is equipped with a stirrer and reflux condenser, and are heated to about 55° C. The components are reacted until a final viscosity of 25,000 cp has been reached, and then diluted with 52,900 parts of tetrahydrofuran to a solids content of 12.5%. The reaction is stopped simultaneously by the addition of 50 parts of dibutylamine. The K value of the polymer formed is about 63, measured in 1% strength solution in dimethylformamide.

100,000 parts of steel balls, 16,000 parts of the above 12.5% strength solution of the elastomeric polyurethane in tetrahydrofuran, 10,000 parts of a 10% strength solution of a polyvinyl formal in tetrahydrofuran, 240 parts of lecithin, 240 parts of butyl stearate, 360 parts of conductive carbon, 12,000 parts of acicular magnetic iron oxide having a coercive force of 23.5 kiloamps/m, and 4,500 parts of tetrahydrofuran are introduced into a steel ball mill having a capacity of 100,000 parts by volume and being operated at 40 rpm, and dispersed for about 72 hours. The resulting magnetic dispersion is then filtered under pressure through a filter having a pore width of 5 μm, following which a polyethylene terephthalate film 75 μm thick is coated with the magnetic dispersion using a knife coater, and the coating is dried at from 50° to 100° C. After drying, the magnetic coating has a thickness of 2.7 μm. The other side of the film is then coated in the same way in a second operation. The coated web is calendered by passing it between heated rollers (50° C.) at a nip pressure of 200 kg/cm. Discs having the standardized measurements for diskettes are stamped out of the coated film.

These diskettes were subjected to the following tests, the results of which are given in Table 1.

1. Dropouts

In order to detect a data signal stored on a recording medium, it is essential that the difference between the level of the output signal and the noise level should be large enough. Flaws and inhomogeneities in the magnetic coating of the medium lead to a reduction in the signal level, as a result of which a stored signal can no longer be read. Errors of this kind are referred to as dropouts. Dropouts are measured by writing a circular track on the magnetic disc with continuous flux changes at intervals of 2 μsec. In a subsequent reading operation a check is made whether each read pulse produced by a flux change has a minimum amplitude of 50% with reference to the average amplitude. The average of the measurements on 20 diskettes is determined in each case.

2. Peak shift errors

At an otherwise sufficiently large signal amplitude, a special kind of imperfection in the coating results in phase shifts, i.e. errors caused by the displacement, with respect to time, of the read pulse peaks carrying the information vis-à-vis the position normally to be expected. This shift can be tolerated in a code-dependent region in the case of data evaluation. However, the read voltage peaks can be shifted out of the expected period, which results in flase interpretation. The tendency of a magnetic coating to exhibit peak shift errors can be ascertained by measuring signal displacement with respect to time. For this purpose a track is written once with a peak shift-susceptible data pattern (1110110), and the interval between the read voltage pulses of the last two 1's is measured. This interval should not exceed a specific limit which is dependent on the recording method employed. In the instant test an interval of 2 μsec was chosen. In the MFM (modified frequency modulation) recording method peak shift caused by the magnetic coating should not exceed 2.8 μsec, but, to ensure reliable reproduction of the recorded data, should if possible be close to 2 μsec. The average of 10 measurements was determined in each case.

3. Drop-ins

Drop-ins are ascertained by writing a circular track on the magnetic disc with a signal produced with a D.C. field. Every inhomogeneity in the coating produces a read signal in the head, which, if the read signal exceeds 20% of the desired read voltage, is defined as an error. The average of 10 measurements is determined in each case.

4. Modulation

A recording is made on the rotating disc in circular concentric tracks. The head is positioned above 76 tracks, the disc rotating at 360 rpm. The short-wave modulation, i.e. the fluctuations in the read voltage amplitude about the average in the course of one rotation, is measured according to ECMA/TC-19/76/27, Paragraph 5.2.1.6.

5. Abrasion resistance

To determine the abrasion resistance, the magnetic disc is placed on a rotating support and loaded with stationary 80 g weights having a specific surface area. The life of the magnetic coating is defined as the number of minutes which elapse before the occurrence of the first permanent error.

EXAMPLE 2

6,600 parts of a polyester prepared from adipic acid and butanediol, and having a molecular weight of 1,100, 920 parts of butanediol, 60 parts of glycerol, 4,953 parts of diphenylmethane-4,4'-diisocyanate are dissolved in 28,720 parts of tetrahydrofuran in a reaction vessel having a capacity of 150,000 parts by volume which can be heated and is equipped with a stirrer and reflux condenser, and are heated to about 55° C. The components are reacted until a final viscosity of 28,000 cp has been reached, and then diluted with 59,510 parts of tetrahydrofuran to a solids content of 12.5%. The reaction is stopped simultaneously by the addition of 50 parts of isopropanol. The K value of the polymer formed is about 63, measured in 1% strength solution in dimethylformamide.

100,000 parts of steel balls, 24,000 parts of the above 12.5% strength solution of the elastomeric polyurethane, 240 parts of lecithin, 240 parts of butyl stearate, 360 parts of conductive carbon, 12,000 parts of acicular magnetic iron oxide having a coercive force of 23.5 kiloamps/m, and 6,500 parts of tetrahydrofuran are introduced into a steel ball mill having a capacity of 100,000 parts by volume and being operated at 40 rpm, and dispersed for about 72 hours. Further processing, and testing of the resulting diskettes are carried out as described in Example 1. The test results are given in Table 1.

EXAMPLE 3

4,980 parts of polycaprolactone having a molecular weight of 830, 1,100 parts of butanediol, 95 parts of trimethylolpropane, 5,060 parts of diphenylmethane-4,4'-diisocyanate are dissolved in 25,700 parts of tetrahydrofuran in a reaction vessel having a capacity of 150,000 parts by volume which can be heated and is equipped with a stirrer and reflux condenser, and are heated to about 55° C. The components are reacted until a final viscosity of about 20,000 cp has been reached, and then diluted with 52,300 parts of tetrahydrofuran to a solids content of 12.5%. The reaction is stopped simultaneously by the addition of 50 parts of methanol. The K value of the polymer formed is about 61, measured in 1% strength solution in dimethylformamide.

100,000 parts of steel balls, 19,200 parts of the above 12.5% strength solution of the elastomeric polyurethane, 3,000 parts of a 20% strength solution of an epoxy resin, prepared from epichlorohydrin and bisphenol A, in tetrahydrofuran, 240 parts of lecithin, 240 parts of butyl stearate, 360 parts of conductive carbon, 12,000 parts of acicular magnetic iron oxide having a coercive force of 23.5 kiloamps/m, and 7,200 parts of tetrahydrofuran are introduced into a steel ball mill having a capacity of 100,000 parts by volume and being operated at 40 rpm, and dispersed for about 72 hours. Further processing, and testing of the resulting diskettes are carried out as described in Example 1. The test results are given in Table 1.

COMPARATIVE EXPERIMENT A

For this experiment an elastomeric polyester urethane was prepared according to Example 3 of German Laid-Open Application DOS No. 2,442,762 by reacting a polyesterdiol with isocyanate using a branched chain extender.

100,000 parts of steel balls, 15,000 parts of this polyester urethane in the form of a 20% strength solution in tetrahydrofuran, 240 parts of lecithin, 240 parts of butyl stearate, 360 parts of conductive carbon, 12,000 parts of acicular magnetic iron oxide having a coercive force of 23.5 kiloamps/m, and 14,400 parts of tetrahydrofuran are introduced into a steel ball mill having a capacity of 100,000 parts by volume and being operated at 40 rpm, and dispersed for about 72 hours. Further processing, and testing of the resulting diskettes are carried out as described in Example 1. The test results are given in Table 1.

COMPARATIVE EXPERIMENT B

For this experiment a mixture of a polyester urethane, produced according to German Printed Application DAS No. 1,282,700 by polyaddition in the melt, and a phenoxy resin according to German Printed Application DAS No. 1,295,011 was used as binder.

100,000 parts of steel balls, 14,000 parts of a 15% strength solution of the elastomeric polyurethane according to German Printed Application DAS No. 1,282,700 in tetrahydrofuran, 3,500 parts of a 20% strength solution of the phenoxy resin, prepared from epichlorohydrin and bisphenol A, in tetrahydrofuran, 240 parts of lecithin, 240 parts of butyl stearate, 360 parts of conductive carbon, 12,000 parts of acicular magnetic iron oxide having a coercive force of 23.5 kiloamps/m, and 12,000 parts of tetrahydrofuran are introduced into a steel ball mill having a capacity of 100,000 parts by volume and being operated at 40 rpm, and dispersed for about 72 hours. Further processing, and testing of the resulting diskettes are carried out as described in Example 1. The test results are given in Table 1.

COMPARATIVE EXPERIMENT C 100,000 parts of steel balls, 14,000 parts of a 15% strength solution of an elastomeric polyurethane according to German Printed Application DAS No. 1,282,700 in tetrahydrofuran, 10,500 parts of a 10% strength solution of a polyvinyl formal in tetrahydrofuran, 240 parts of lecithin, 240 parts of butyl stearate, 360 parts of conductive carbon, 12,000 parts of acicular magnetic iron oxide having a coercive force of 23.5 kiloamps/m, and 5,000 parts of tetrahydrofuran are introduced into a steel ball mill having a capacity of 100,000 parts by volume and being operated at 40 rpm, and dispersed for about 72 hours. Further processing, and testing of the resulting diskettes are carried out as described in Example 1. The test results are given in Table 1.

EXAMPLE 4

100,000 parts of steel balls, 16,000 parts of the 12.5% strength solution of the elastomeric polyurethane in tetrahydrofuran used in Example 1, 10,000 parts of a 10% strength solution, in tetrahydrofuran, of a polyvinyl formal containing 82% of vinyl formal units, 12% of vinyl acetate units and 6% of vinyl alcohol units, 270 parts of butyl stearate, 270 parts of zinc oleate, 13,500 parts of a ferromagnetic chromium dioxide pigment having an average particle size of 0.5 μm and a length-to-width ratio of 4:1 to 9:1, and 4,500 parts of tetrahydrofuran are introduced into a steel ball mill having a capacity of 100,000 parts by volume and being operated at 40 rpm, and dispersed for about 120 hours. The resulting magnetic dispersion is then filtered under pressure through a filter having a pore width of 5 μm. A polyethylene terephthalate film 20 μm thick is coated with the magnetic dispersion using a knife coater, and, after the coated film has been passed through a magnetic orienting field, the coating is dried at from 60° to 100° C. The coated film is calendered by passing it between heated rollers (70° C.) at a nip pressure of 200 kg/cm, the thickness of the resulting magnetic coating being 5.0 μm. The coated film is then slit into 1" tapes.

The following tests were carried out on a commercial 1" video recorder:

1. Signal-to-noise ratio

This is the ratio of the rms noise voltage to the peak voltage of the video signal, measured in decibels.

2. Number of errors

A drop in the level of the high frequency signal of more than 20 db for more than 20 μsec is defined as a dropout. The number of dropouts per minute is given.

3. Durability

In this test BCT and EOT markers are stuck to the ends of a piece of tape 13 m long, the said markers causing the tape to reverse its direction of travel every 60 seconds. The tape transport speed of the recorder is 21 cm/sec. The number of passes that can be made before a dropout occurs is measured.

The test results are given in Table 2.

COMPARATIVE EXPERIMENT D

The procedure of Example 4 is followed, except that the 16,000 parts of the 12.5% strength solution of the elastomeric polyurethane of the present invention are replaced by 16,000 parts of a 12.5% strength solution, in tetrahydrofuran, of an elastomeric polyurethane produced according to Example 3 of German Laid-Open Application DOS No. 2,442,762. Further processing and testing are carried out as described in Example 4. The test results are given in Table 2.

COMPARATIVE EXPERIMENT E

The procedure of Example 4 is followed, except that the 16,000 parts of the 12.5% strength solution of the elastomeric polyurethane of the present invention are replaced by 16,000 parts of a 12.5% strength solution, in tetrahydrofuran, of a polyester urethane produced according to German Printed Application DAS No. 1,295,011 by the melt condensation process. Further processing and testing are carried out as described in Example 4. The test results are given in Table 2.

TABLE 1

|  | Example 1 | Example 2 | Example 3 | Comparative Experiment A | Comparative Experiment B | Comparative Experiment C |
| --- | --- | --- | --- | --- | --- | --- |
| Dropouts | 1 | 7 | 4 | 11 | 17 | 10 |
| Peak shift | 2.16 | 2.45 | 2.39 | 2.65 | 2.84 | 2.71 |
| Drop-ins | 21 | 17 | 31 | 51 | 46 | 37 |
| Modulation | 4% | 4% | 5% | 8% | 11% | 9% |
| Abrasion resistance | >150 | >150 | 145 | 90 | 85 | 110 |

TABLE 2

|  | Signal-to-noise ratio | Number of dropouts/minute | Durability |
| --- | --- | --- | --- |
| Example 4 | +3 | 4 | 800 |
| Comp. Exp. D | +1.5 | 8 | 500 |
| Comp. Exp. E | 0 | 11 | 400 |

We claim:

1. A magnetic recording medium comprising a non-magnetic base and, applied thereto, a firmly adhering magnetic coating consisting essentially of a dispersion of a magnetic pigment in a binder which contains at least 50 percent by weight of a thermoplastic polyurethane which is soluble in tetrahydrofuran, is free from isocyanate groups and has been made by reaction of (A) 1 mole of a hydroxy-containing polyester having a molecular weight of from 700 to 2,500, wherein said hydroxyl-containing polyester is formed by esterification of aliphatic dicarboxylic acids of 4 to 12 carbon atoms, carboxylic acid esters of 1 to 4 carbon atoms in the alcohol radical, carboxylic acid anhydrides or carboxylic acid chlorides with aliphatic glycols of 2 to 12 carbon atoms which may contain ether groups, in the presence as a chain extender of (B) from 0.3 to 3 moles of a linear aliphatic diol containing from 2 to 10 carbon atoms and (C) from 0.05 to 0.4 moles of a triol containing from 3 to 10 carbon atoms and (D) from 1.35 to 4.7 moles of an aromatic diisocyanate containing from 6 to 30 carbon atoms, the amount of isocyanate groups present in the reaction being approximately equivalent to the amount of hydroxy groups in the components A to C.

2. The magnetic recording medium of claim 1, wherein the reaction to produce the polyurethane has been carried out in an organic solvent which does not react with the diisocyanate under the reaction conditions.

3. The magnetic recording medium of claim 1, wherein the polyurethanes have a softening point greater than 125° C. and have a hardness, measured according to DIN 53,157, of from 18 to 35 seconds.

4. The magnetic recording medium of claim 1, wherein the binder consists solely of the polyurethanes.

5. The magnetic recording medium of claim 1, wherein (A) is a polyester formed from adipic acid and butane diol, chain extender (B) is butane diol, triol (C) is selected from the group consisting of trimethylolpropane and glycerol and diisocyanate (D) is diphenylmethane-4,4'-diisocyanate.

* * * * *